United States Patent
Hackner

(10) Patent No.: US 9,681,674 B2
(45) Date of Patent: Jun. 20, 2017

(54) METHOD AND DEVICE FOR WELDING CASINGS

(71) Applicant: CDS Hackner GmbH, Crailsheim (DE)

(72) Inventor: Michael Hackner, Crailsheim (DE)

(73) Assignee: CDS Hackner GmbH, Crailsheim (DE)

( * ) Notice: Subject to any disclaimer, the term of this patent is extended or adjusted under 35 U.S.C. 154(b) by 161 days.

(21) Appl. No.: 14/375,446

(22) PCT Filed: Feb. 4, 2013

(86) PCT No.: PCT/EP2013/052179
§ 371 (c)(1),
(2) Date: Jul. 30, 2014

(87) PCT Pub. No.: WO2013/113940
PCT Pub. Date: Aug. 8, 2013

(65) Prior Publication Data
US 2015/0013881 A1    Jan. 15, 2015

(30) Foreign Application Priority Data

Feb. 2, 2012    (DE) .................. 10 2012 001 924

(51) Int. Cl.
*A22C 13/00* (2006.01)
*B29C 65/22* (2006.01)
(Continued)

(52) U.S. Cl.
CPC .......... *A22C 13/0006* (2013.01); *A22C 13/00* (2013.01); *A22C 13/0003* (2013.01);
(Continued)

(58) Field of Classification Search
USPC ....................................... 156/158
See application file for complete search history.

(56) References Cited

U.S. PATENT DOCUMENTS 2,685,770 A * 8/1954 Conti ................. A22C 13/0003
101/35
3,799,823 A    3/1974 Talty et al.
(Continued)

FOREIGN PATENT DOCUMENTS

CH    595 202 A5    2/1978
DE    679 748 C    8/1939
(Continued)

OTHER PUBLICATIONS

International Search Report of PCT/EP2013/052179, mailed Nov. 21, 2013.
(Continued)

*Primary Examiner* — Jeff Aftergut
(74) *Attorney, Agent, or Firm* — Collard & Roe, P.C.

(57) ABSTRACT

The invention relates to a device (1) for producing a case having a large length for food, in particular for sausages, from a plurality of individual case sections made of casings that contain collagens, such as natural casings or collagen-containing artificial casings, comprising a mandrel (2) and at least two sleeve sections (3), wherein the sleeve sections (3), in order to create an overlapping area (4), are pushed over the mandrel (2) and arranged such as to overlap each other, a heating element (5) for temporarily exchanging heat between the heating element (5) and the overlapping area (4), such that the case sections are at least partially welded to each other in the overlapping area (4), a deformable extension body (6), wherein the deformable extension body annularly surrounds the mandrel (2) and is arranged inside the case sections (3), wherein the deformable extension body (6) is made of an elastically deformable material, and a mold (7) that encloses the mandrel (2) in some sections.

20 Claims, 5 Drawing Sheets

(51) Int. Cl.
  *B29C 65/00* (2006.01)
  *B29K 511/00* (2006.01)
  *B29L 23/00* (2006.01)

(52) U.S. Cl.
  CPC ........ *B29C 65/224* (2013.01); *B29C 66/0044* (2013.01); *B29C 66/1122* (2013.01); *B29C 66/232* (2013.01); *B29C 66/5221* (2013.01); *B29C 66/634* (2013.01); *B29C 66/8167* (2013.01); *B29C 66/81423* (2013.01); *B29C 66/81455* (2013.01); *B29C 66/81871* (2013.01); *A23V 2002/00* (2013.01); *B29K 2511/00* (2013.01); *B29L 2023/002* (2013.01); *Y10T 156/10* (2015.01)

(56) References Cited

U.S. PATENT DOCUMENTS 4,364,511 A * 12/1982 Wittern ............... A22C 11/12
  383/24
5,750,217 A * 5/1998 Kearby ............... A22C 13/0013
  426/105
2004/0234655 A1 * 11/2004 Hackner ............... A22C 13/00
  426/138

FOREIGN PATENT DOCUMENTS

| | | |
|---|---|---|
| DE | 38 02 995 A1 | 8/1989 |
| EP | 0634328 A1 * | 1/1995 |
| EP | 794048 A1 * | 9/1997 |
| EP | 1 392 123 B1 | 3/2004 |
| GB | 645 841 A | 11/1950 |

OTHER PUBLICATIONS

German Search Report of 10 2012 001 924.6, dated Oct. 1, 2012, with English translation of the relevant parts.

* cited by examiner

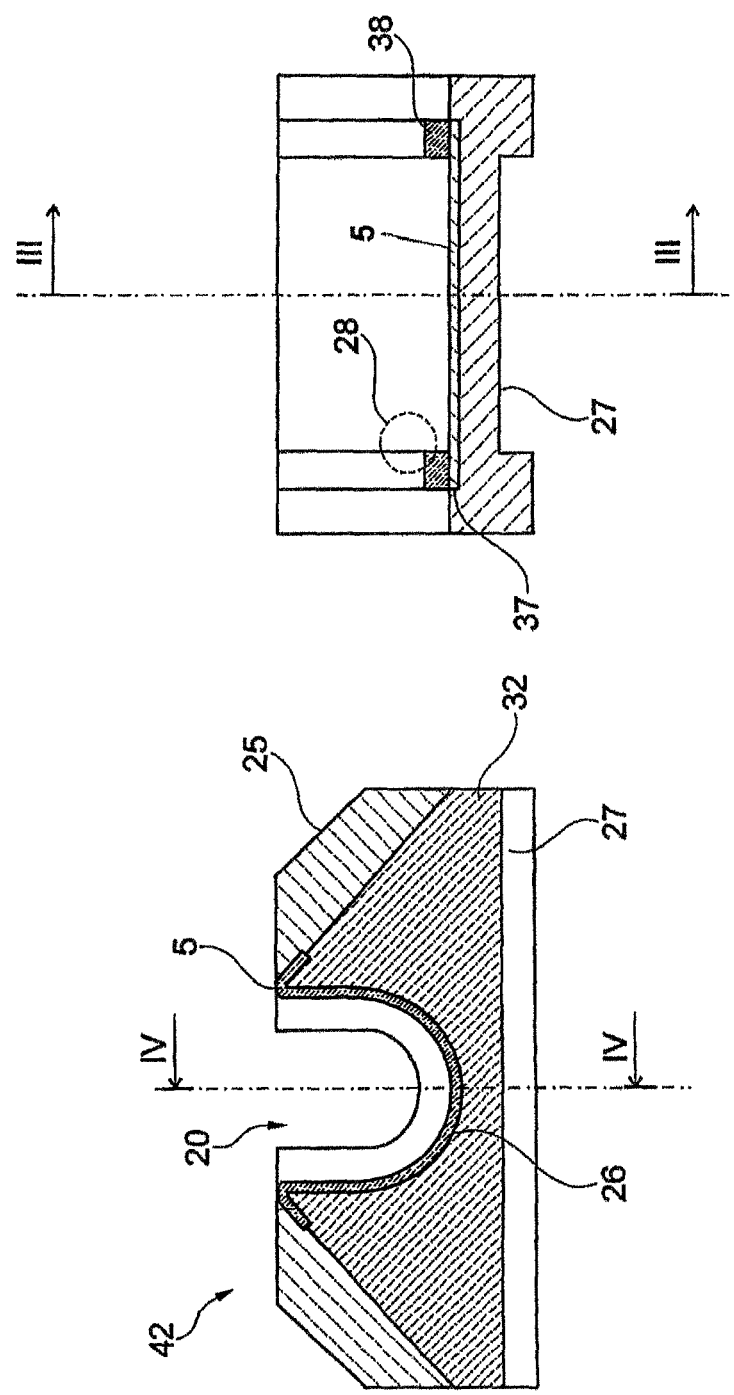

METHOD AND DEVICE FOR WELDING CASINGS

CROSS REFERENCE TO RELATED APPLICATIONS

This application is the National Stage of PCT/EP2013/052179 filed on Feb. 4, 2013, which claims priority under 35 U.S.C. §119 of German Application No. 10 2012 001 924.6 filed on Feb. 2, 2012, the disclosure of which is incorporated by reference. The international application under PCT article 21(2) was not published in English.

BACKGROUND OF THE INVENTION

1. Field of the Invention

The invention relates to an apparatus for the production of a sheath having a greater length, for foods, particularly for sausages, from a plurality of individual sheath sections composed of casings that contain collagens, such as natural casings or synthetic casings containing collagens, comprising a mandrel and at least two sheath sections, wherein the sheath sections are pushed on over the mandrel in order to create an overlapping region, and disposed overlapping one another, and having a heating element for temporary exchange of heat between heating element and the overlapping region, so that the sheath sections are welded to one another, at least in part, in the overlapping region, and having a deformable expansion body, wherein this body is configured to surround the mandrel in the manner of a ring, and is disposed within the sheath sections, wherein the deformable expansion body is configured to consist of an elastically deformable material, and having a tool mold that encloses the mandrel in certain sections.

Furthermore, the invention relates to a method for the production of a sheath having a greater length, for foods, particularly for sausages, from a plurality of individual sheath sections composed of casings that contain collagens, such as natural casings or synthetic casings containing collagens, wherein sheath sections are pushed onto a mandrel, one after the other, wherein two end regions of consecutive sheath sections that face one another overlap on the mandrel and form an overlapping region of sheath sections, wherein heat and pressure are simultaneously applied temporarily to the overlapping region of the two sheath sections, so that the sheath sections are welded to one another, at least in part, in the overlapping region, wherein the overlapping region of the two sheath sections is positioned above a deformable expansion body, wherein the expansion body is enlarged, before or during the welding process of the overlapping region, from its starting diameter to its end diameter, which corresponds to the maximal casing caliber of the natural casing, and thereby the overlapping region is also enlarged in its diameter, and after the welding process, the expansion body is moved back to its starting diameter.

2. Description of the Related Art

Such a method and an apparatus are known from the European Patent EP 1 392 123. In the systems structured according to this patent, a divided metal block, heated internally to the welding temperature, is used as an outer welding tool that encloses an expansion body, against which tool the expansion body presses the overlapped natural casing with its entire moisture. As a result, when the metal block, as a tool mold, is closed and the expansion body is widened, sudden heat stress on the casing occurs, as soon as it touches the metal block and before the pressure has been completely built up. The residual water is immediately brought to sudden evaporation. In this connection, tiny gas bubbles occur, which burst and can damage the casing tissue. This steam is drawn off by means of a vacuum that is applied. However, tissue damage caused by the evaporation of the water cannot be prevented.

SUMMARY OF THE INVENTION

It is therefore the task to propose an apparatus and a method that allow durable welding of casing sheath sections, in rapid and reliable manner.

This task is accomplished, in the case of an apparatus for the production of a sheath having a greater length, for foods, particularly for sausages, from a plurality of individual sheath sections composed of casings that contain collagens, such as natural casings or synthetic casings containing collagens, comprising a mandrel and at least two sheath sections, wherein sheath sections are pushed on over the mandrel in order to create an overlapping region, and disposed overlapping one another, and having a heating element for temporary exchange of heat between heating element and the overlapping region, so that the sheath sections are welded to one another, at least in part, in the overlapping region, and having a deformable expansion body, wherein this body is configured to surround the mandrel in the manner of a ring, and is disposed within the sheath sections, wherein the deformable expansion body is configured to consist of an elastically deformable material, and having a tool mold that encloses the mandrel in certain sections, in that a heating wire is provided as a heating element, wherein the heating wire is preferably disposed between the tool mold and the overlapping region.

Heating wires are thin and therefore can heat up quickly. Their heating can be controlled by way of the current that flows through them, so that welding can be carried out quickly and in controlled manner. Because the welding is carried out quickly, the steam formation is minimized, so that the stress on the sheaths is reduced. Heating wires demonstrate great chemical stability, so that they can be washed with usual cleaning agents. Heating wires can be glued into indentations or depressions in the tool mold, so that the tool mold can have the heating wire applied to it. Because heating wires have a heat capacity that is advantageously low, they cool off rapidly after the heating current is shut off. Optimally, heating wires can be excellently adapted for tool molds, for example by way of recesses for bores. A constant weld seam thickness can be welded by means of different power output, as a function of the casings to be welded. Because heating wires are flexible, they can be used in complicated geometries. They are therefore particularly suitable for introduction into a cylindrical welding chamber, which encloses a cylindrical expansion body as a partially closed space, and in which casing pieces or sheaths are supposed to be joined under pressure and heat.

Because a welding chamber that encloses the expansion body is formed between expansion body and tool mold, the axial expanse of which chamber is configured to correspond at least to the length of the expansion body, the entire overlapping region of the casing can be pressed against the tool mold, ideally against a coated woven fabric in the welding chamber, which prevents direct contact of the casing with the heating element. In this way, weld seams can be produced on the entire overlapping region. The durability of the bond is improved by means of setting multiple weld seams next to one another, and the flexibility of the native casing material is maintained, to a great extent.

It is advantageous if the heating wire is configured to be covered with a parting layer and/or if a parting layer is provided between heating wire and tool mold, wherein the parting layer preferably consists of a PTFE-coated woven fabric. In this way, the heating wire is heated up more quickly and the cycle time is shortened. Because no heating-up and cooling-down times are needed for the tool mass, cycling of the welding method can be increased. The throughput is increased. Also, energy is saved, because the mass of the tool mold does not absorb any heat. In addition, the parting layer facilitates cleaning. PTFE, Teflon, demonstrates excellent parting and sliding properties. PTFE is resistant to a great number of chemicals and can therefore be used for the foods industry. It is tear-resistant and dimensionally stable. Because PTFE is physiologically safe, it is approved for contact with foods. It can be heated in the temperature range that is important for welding, of above +200° C., for a long time.

Ideally, the heating element, i.e. the heating wire or the heating foil, is configured with the same shape for different calibers, wherein a heating zone is configured with different lengths and adapted to the caliber. Independent of the diameter, i.e. the caliber of the sausage sheath sections, the overlapping and connecting region is always of approximately the same length. The width in the direction of the mandrel is selected to be the same for all calibers, so that all the tool molds can be easily installed into the machine, independent of the caliber. The outer dimensions of the tool mold, i.e. its interface with the machine, therefore do not change. However, the mandrel tip is adapted to the casing calibers, in each instance, with the diameter of the expansion body and the two tools halves of the tool mold. As soon as a different caliber is to be welded, these parts are replaced, as a set.

The measure that the tool mold is configured to form the mandrel, divided with a gap, promotes the fact that evaporated water, oil, or fats can be more easily conducted away from the tool mold during welding. In this way, an excess pressure in the welding chamber is prevented, so that no elevated forces are introduced into the tool mold. The sausage sheath sections possess sufficient space for lying against the welding chamber. Sheath material can be pulled along from the sides during expansion.

A In a further embodiment of the heating element, the latter has oblong holes for fastening the heating wire in the tool mold, at its flattened ends. Thereby the heating element can also easily be flexibly screwed in place in the tool mold, by means of the oblong holes, even at different calibers. Contacting takes place along with making of the screw connection. The tool mold is produced from electrically insulating material. It is also advantageous if the material of the tool mold conducts heat poorly.

In a further embodiment, at least one controller is provided, which is configured to use an instantaneous resistance value of the heating wire as a temperature signal. By means of measuring the resistance value, the controller determines the instantaneous temperature in the immediate vicinity of the weld, and generates a signal for cycling of the welding process from this. The measured value can be compared with a set reference value, so that a regulation signal can be derived from the difference between reference value and measured value, which signal prevents burning or cooking of the overlapping sausage sheath sections.

If a tool mold closing device is provided, preferably a self-holding tool mold closing device, for example by way of a knee lever mechanism, then work safety is increased. It is not possible for the closed tool mold to suddenly open during welding, so that there is no risk for the operating personnel resulting from sudden opening of the tool mold. Furthermore, no active holding force needs to be applied during welding of the sausage sheath sections.

Ideally, a mandrel tip, including the expansion body, is configured as a module, wherein the module is preferably configured to be rapidly interchangeable as a whole. Because of this interchangeability, production interruptions are kept as short as possible. The module can be changed quickly and expeditiously.

The task assignment is accomplished, in the case of a method for the production of a sheath having a greater length, for foods, particularly for sausages, from a plurality of individual sheath sections composed of casings that contain collagens, such as natural casings or synthetic casings containing collagens, wherein sheath sections are pushed onto a mandrel, one after the other, wherein two end regions of consecutive sheath sections that face one another overlap on the mandrel and form an overlapping region of sheath sections, wherein heat and pressure are simultaneously applied temporarily to the overlapping region of the two sheath sections, so that the sheath sections are welded to one another, at least in part, in the overlapping region, wherein the overlapping region of the two sheath sections is positioned above a deformable expansion body, wherein the expansion body is enlarged, before or during the welding process of the overlapping region, from its starting diameter to its end diameter, which corresponds to the maximal casing caliber, and thereby the overlapping region is also enlarged in its diameter, and after the welding process, the expansion body is moved back to its starting diameter, in that first, water is pressed out of the casing from a tool mold that encloses the mandrel, preferably from the center toward the two open ends of the tool mold.

Optimally, the heating element is heated up to a welding temperature of greater than 100° C., preferably greater than 200° C. and less than 220° C., for welding, after the tool mold is closed, and/or a welding temperature is held for a pre-set period of time. The welding temperature can also be regulated, if necessary. In this way, it is possible to gently weld together the two sausage sheath sections that lie on top of one another. Starting from a temperature of 100° C., the sausage sheath sections are depth-coagulated during this process, because the tissue is heated to more than 50° C. to 80° C. over a large area. Ideally, welding ensures tight join locations. Furthermore, smooth transitions are produced, which also satisfy esthetic demands. Aside from the welding of the seams with a parallel joint, wherein the parts are welded while overlapping and lying one on top of the other over a large area, welding with an overlap joint or a butt joint is also possible. When connecting two consecutive casings without the addition of a similar material, but with the application of pressure and heat, typical binding defects of welding are minimized. It is particularly advantageous that the pressure can be built up first, and thereby the water is pressed out to a great extent. Subsequently, the casing ends already lie on top of one another, pressed firmly together, before or while the heat is gradually increased. The gradual, controlled heating, after the reference pressure on the casing walls has been built up, by way of what is called a heating ramp, i.e. the gradual increase in the temperature of the heating element, leads to the result that no significant steam is formed, i.e. that microscopically small sudden evaporation processes, which damage the casing sheath, therefore do not occur, either. Suctioning as required in the state of the art is not necessary. This is a decisive advantage. The welding seam becomes tighter, more reliable, and the edge regions are no longer stressed with hot steam. As a result, the durability of the seam is significantly improved.

Because at least two parallel weld seams are set, the security of the seam is increased.

In a further embodiment of the method, lateral delimitation of the pressure region is undertaken, in order to extend the useful lifetime of the expansion body.

In a further embodiment of the method, the casing is desalinated before welding, and is lightly salted after welding, and packed in a vacuum with the addition of a reduced brine, and subsequently frozen.

BRIEF DESCRIPTION OF THE DRAWINGS

A preferred embodiment of the invention will be explained as an example, using figures. The figures show, in detail.

DETAILED DESCRIPTION OF THE PREFERRED EMBODIMENTS

Figure 1:
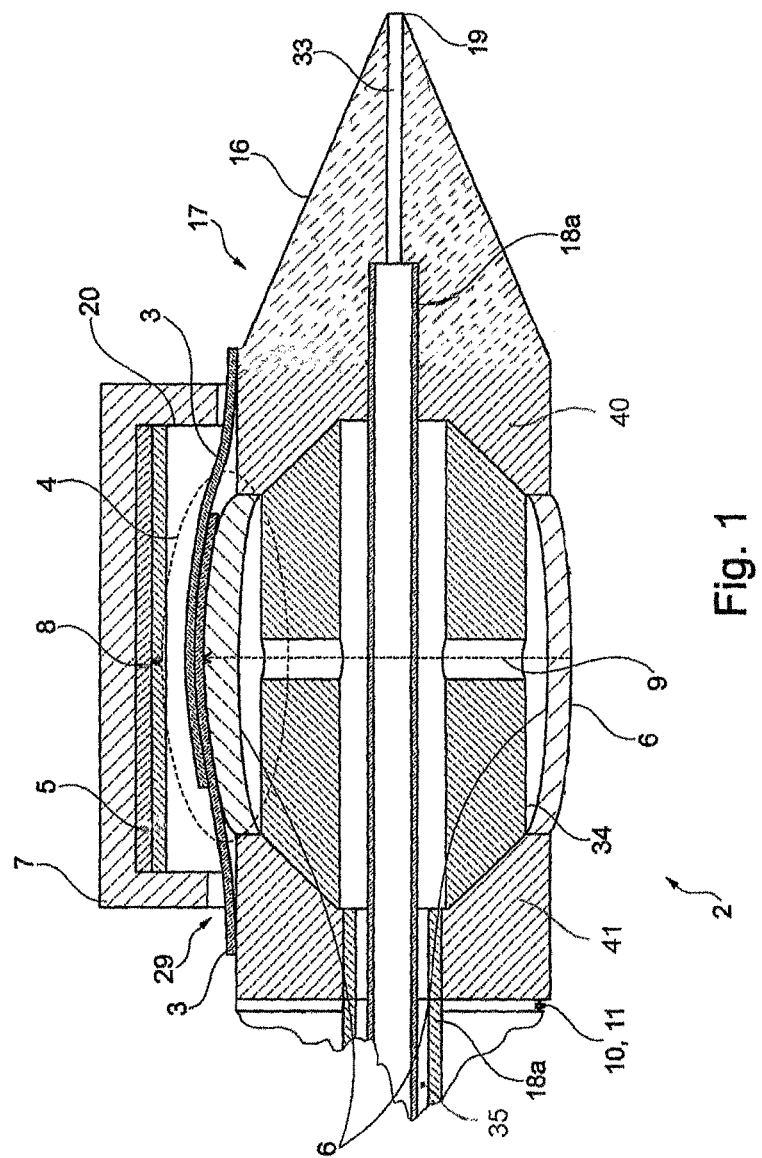
FIG. 1 an axial section through a mandrel, with the upper half-shell of the tool mold, FIG. 2 a-c a view of a heating wire as a foil heating element, FIG. 3 a cross-section through a lower half-shell of the tool mold, FIG. 4 an axial section through the lower half-shell along the section line IV-IV in FIG. 3.

FIG. 1 shows an axial section through the mandrel, with the upper half-shell of the tool mold. The lower half-shell was not shown in the drawing, for the sake of clarity. The mandrel 2 is shaped into a mandrel tip 16 at its free end, in order to be able to gather the casing sheaths on more easily. At its other end, there is a parting line 10, which represents the boundary of the module, so that the mandrel can be easily separated from the remainder of the lance 39 at this location, in order to be able to adapt the mandrel to changed casing calibers. A tube 18a for supplying a pressure medium, for example water, runs axially through the mandrel.

The tube 18a opens into a bore 33. The latter exits at the mandrel tip 16. An expansion body 6 runs around the blowing body 34 in the manner of a ring. A section 40 follows the mandrel tip 16 (FIG. 5), into which an inner cone is countersunk. The ends of two sausage sheath sections 3 are positioned radially around the outer surface of the expansion body 6, in such a manner that they overlap. The common overlapping region 4 of the two sausage sheath sections 3 extends from the free end of the sausage sheath sections 3 that lies underneath all the way to the free end of the sausage sheath section 3 that lies on top. In order for it to be possible to press the overlapping region 4 away axially outward in the direction of the sheathing welding chamber 20, the overlapping region 4 lies within the welding chamber 20 of the tool mold 7. The tool mold 7 comprises a parting layer 8 that is laid into the tool mold 7 and covers the heating element 5, and thereby separates it from the casing sheath section. The expansion body 6 is a short hose section, the ends of which are clamped between the inner cone of the mandrel tip 16, the section 40, and an inner cone structured in similar manner in the mandrel body 41, and a blowing body 34 disposed in between.

Figure 2A:
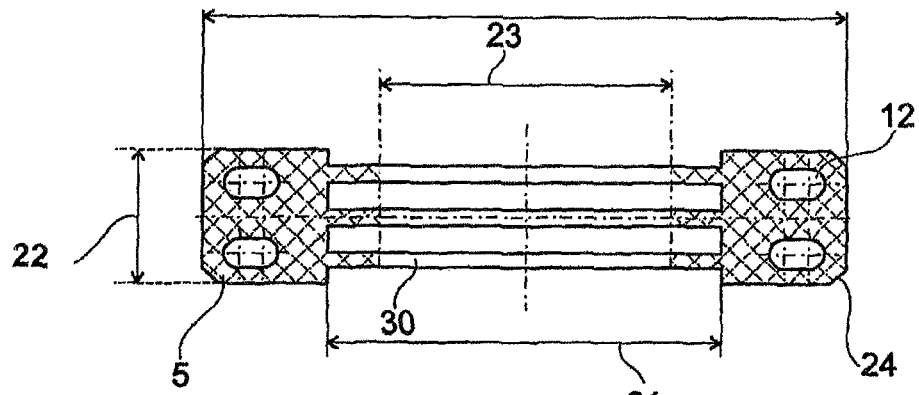
Figure 2B:
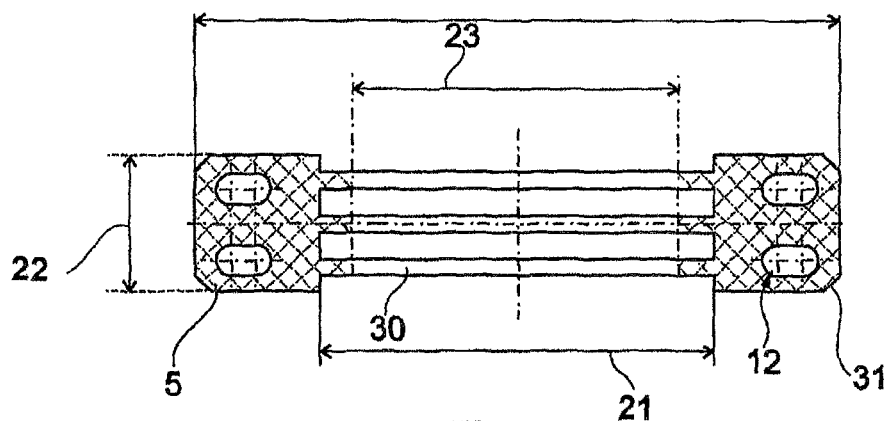
Figure 2C:
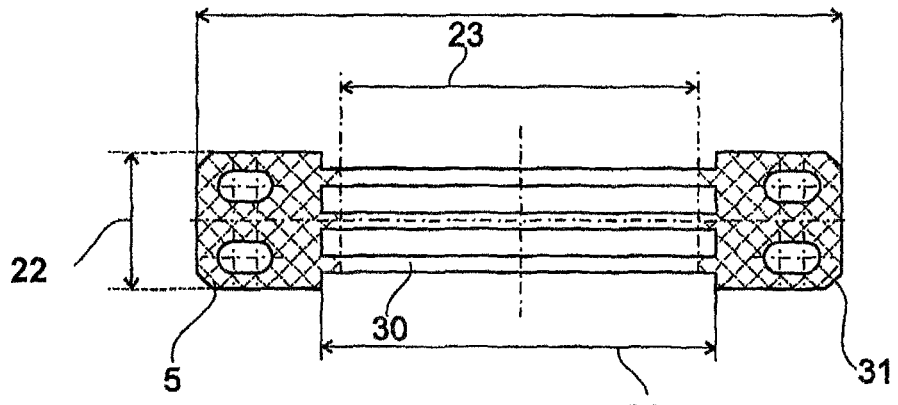

FIGS. 2 a-c show heating elements 5 in the form of punched-out foils for different calibers 9 of the mandrel 2.

The caliber 9 designates the diameter of the casing sheath. Despite different calibers 9, the length 21 and width 22 of the heating elements 5 is constant, so that despite different calibers 9, the outside dimensions remain the same. As a result of the recesses between the individual heating strips 30, the weld is carried out precisely and securely, only in the region of the heating strips. Native material of the casing sheath section remains non-welded in the recesses in between, and can flow in. The heat occurs in the heating strips 30 only in the heating region 23. This heating region must be adapted to the caliber of the casing to be welded, in each instance, and the weld occurs only at those locations where the casing sheaths lie against the heating region of the heating strip. In FIGS. 2 a-c, the heating strips for three different caliber ranges are shown.

Despite different calibers, the outer construction shape of the tool mold is the same for all the calibers. The heating elements 5 have oblong holes 12, by means of which the heating elements 5 can be screwed or clamped onto the tool mold 7. Because at least three heating strips 30 are punched out between the two clamping lugs 31, the two sausage sheath sections 3 connect with three independent weld seams. The connection of the sausage sheath sections is thereby triply secured, and is particularly stable. In contrast to a welding surface, the three heating strips 30 can heat up more quickly. Because the outer ends of the clamping lugs 31 have a bevel 24, the heating element 5 can be laid into the tool mold 7 well. The clamping lugs simultaneously serve for contacting the electrical heating elements 5.

FIG. 3 shows a cross-section through a half-shell 42 of a total of two parts of the tool mold 7. A groove 26 is milled into the base body 32 of the half-shell 42, along the inner circumference. The edge 37 of the groove 26 forms a collar 28, relative to the inner surface of the groove, which collar narrows the free diameter. Therefore it is not possible for components to slip out of the groove 26 laterally. The heating element 5 is laid into the groove 26 and covered with a Teflon-coated woven fabric as the parting layer 8. The clamping lugs, which are simultaneously contact surfaces, are screwed onto the tool mold 7 with screws that pass through the oblong holes 12 and by means of clamping blocks 25. The tool mold is composed of electrically insulating material, in order to prevent short-circuiting during contacting. For better contact of heating elements 5 and/or parting layer 8 (FIG. 1) in the groove 26, the heating element 5 and the parting layer 8 (FIG. 1) are pressed into the groove 26 by way of clamping brackets 38, so that the parts are pressed into the groove 26 with precise fit. If desired, multiple parting layers can be laid one on top of the other, or combined, both under and over the heating element 5.

Threaded bores (not shown) are let into bottom groove 27 milled into the bottom of the tool mold 7, to attach the tool mold 7 in the apparatus. The sides of this bottom groove 27 guide the tool half-shell 42 in its accommodation in the machine.

FIG. 4 shows an axial section through the tool shell along the section line IV-IV of FIG. 3. In FIG. 4, the clamping bracket 38 can be seen, which delimits the inside circumference of the groove 26 at the lateral ends of the tool, in the edge region.

For welding two overlapping sausage sheath sections 3, first a sausage sheath section 3 is positioned on the mandrel 2, by way of the mandrel tip 16, and the end is positioned within the tool region. Subsequently, the end of the second section is pulled on, overlapping over the end of the first section. Afterward, the tool halves are folded against the mandrel 2, so that they enclose it on the circumference and a welding chamber 20 is formed. The diameter of the expansion body 6 and thereby the caliber 9 are increased by introduction of a fluid through the ring gap 35 (FIG. 1), for example of compressed air or water under pressure, so that the overlapping sausage sheath sections 3 are clamped in place between expansion body 6 and heating element 5. In the closed state, the tool mold 7 does not lie against the outer sausage sheath section 3. A gap 29 is present between the tool mold 7 and the non-overlapping regions of the sausage sheath sections 3. When the tool mold 7 is closed, the expansion body 6 can therefore not be expanded, whether pneumatically or hydraulically or mechanically, so that the overlapping region 4 of the sausage sheath sections 3 is pressed against the heating strip 30 of the heating element 5. The overlapping sausage sheath sections 3 are welded to one another during this process, under pressure and heat.

First, water is pressed out of the sausage sheath sections 3 during this process, when they are pressed against the heating strips 30. The water pressed out then runs off through the gaps 29 on both sides. Subsequently, the temperature is heated up, from a starting value, in such a manner until the weld seam forms. It is advantageously possible to do without one or more sensors for temperature measurement and regulation, because the temperature is also determined from a resistance measurement of the heating element 5. This is used to stop the welding as soon as the previously set temperature has been reached. Because the gaps 29 allow room for sausage sheath material to flow in, shearing off of the sausage sheath sections at the edges of the welding chamber 20 is prevented.

A controller is programmed to energize the heating element (5) only after water is pressed out of the overlapping region (4).

The casing sheath sections are first sorted by hand, according to caliber. For welding of sorted casing sheath sections of a caliber, the casings are pulled onto the mandrel 2 by hand, one after the other, and welded. After welding has been completed, the tool mold 7 is opened again, so that the sausage sheath sections 3 that have been welded to one another can continue to be pulled onto the mandrel 2, so that the length of the sausage sheath is increased by appending a further sausage sheath section 3. Before the welded sausage sheath sections 3 continue to be pulled onto the mandrel, for example using the gathering wheel 44, they are pulled from the mandrel 2 in the direction of the mandrel tip 16. The operator presses the welded sausage sheath sections 3 with his hand, so that water that is flooded into the welded sausage sheath sections 3 through the exit opening 19 is dammed up. An inspection of the weld seams by means of the operator looking for leakages is thereby possible. If no water exits, the weld fulfills the required tightness.

The mandrel 2 and the mandrel tip 16 form a rapidly replaceable module 17 that can be replaced as needed, for example in case of contamination.

Figure 5:
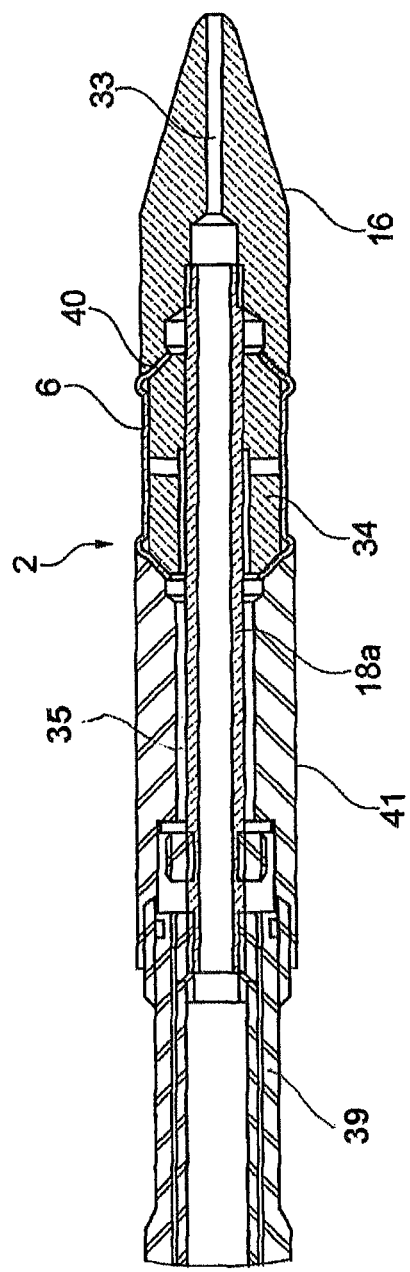
FIG. 5 shows a mandrel in an axial section.

FIG. 5 shows a mandrel 2 in an axial section. The expansion body 6 is clamped between the blowing body 34 and the inner cones of the mandrel tip 16 and the mandrel body 41.

Figure 6:
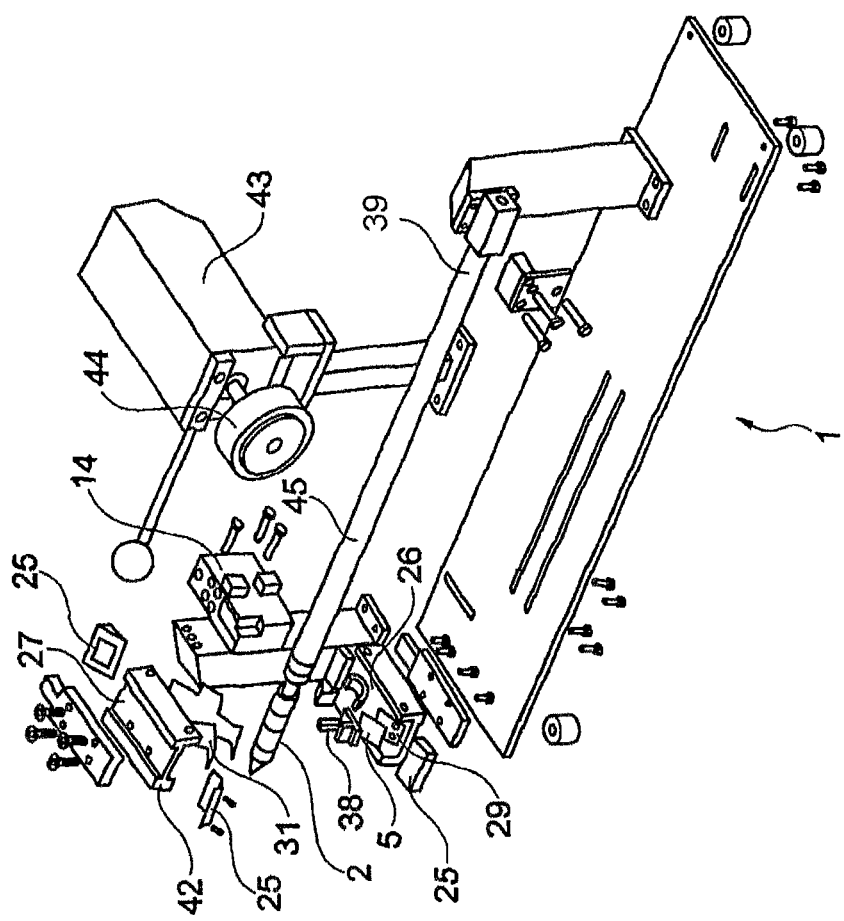
FIG. 6 shows an exploded representation of the welding apparatus.

FIG. 6 shows an apparatus 1 in an exploded representation. The lance 39 is composed of the lance body 45 and the mandrel 2. The gathering wheel 44 is driven by means of the motor 43. This wheel supports the operator in pulling welded sausage sheath sections 3 onto the lance body 45. The tool closing device 14 increases work safety.

For welding, preferably first pressure then heat is applied to the casing sheaths. The pressure already compacts the collagen before the heat comes, and the heat does not come suddenly. Instead, heating up takes place gradually.

The method according to the invention makes do without any vacuum suction. It is surprisingly faster than the known methods and yields a significantly improved seam quality, at increased process safety.

REFERENCE NUMBER LIST 1. welding apparatus
2. mandrel
3. sheath section
4. overlapping region
5. heating element
6. expansion body
7. tool mold
8. parting layer
9. caliber
10. parting line
11. gap
12. oblong holes
13. —
14. tool mold closing device
15. —
16. mandrel tip
17. module
18a tube
19. exit opening
20. welding chamber
21. length of the heating wire
22. width
23. heating region
24. phase
25. clamping block
26. groove
27. bottom groove
28. collar
29. gap
30. heating strip
31. clamping lug
32. base body
33. bore
34 blowing body
35 ring gap
36 —
37 edge
38 clamping bracket
39 lance
40 section
41 mandrel body
42 half-shell
43 motor
44 gathering wheel
45 lance body

The invention claimed is:

1. Method for the production of a sheath having a greater length, for foods, from a plurality of individual sheath sections composed of casings that contain collagens, comprising the steps of pushing sheath sections onto a mandrel, one after the other, wherein two end regions of consecutive sheath sections that face one another overlap on the mandrel and form an overlapping region of sheath sections, simultaneously applying heat and pressure temporarily to the overlapping region of the two sheath sections, so that the sheath sections are welded to one another, at least in part, in the overlapping region, wherein the overlapping region of the two sheath sections is positioned above a deformable expansion body, wherein the expansion body is enlarged, before or during the welding process of the overlapping region, from its starting diameter to its end diameter, which corresponds to the maximal casing caliber, and thereby enlarging the overlapping region also in its diameter, and after the welding process, moving the expansion body back to its starting diameter, wherein before heat and pressure are applied, water is pressed out of the overlapping sheath sections of the casing.

2. Method for welding of casings according to claim 1, wherein the overlapping region is heated by a heating element (5), which is heated up to a welding temperature of greater than 100° C. for welding.

3. Method for welding of casings according to claim 2,
wherein the welding temperature is greater than 200° C. and less than 220° C. for welding after the tool mold is closed and/or a welding temperature is held for a pre-set period of time.

4. Method according to claim 1, wherein at least two parallel weld seams are set.

5. Method for welding of casings according to claim 1, wherein lateral delimitation of the pressure region is undertaken.

6. Method for welding of casings according to claim 1, wherein the casing is desalinated before welding, and is lightly salted after welding, and packed in a vacuum with the addition of a reduced brine, and subsequently frozen.

7. Method for welding of casings according to claim 1,
wherein said foods are sausages,
wherein said casings are natural casings or synthetic casings containing collagens, and
wherein water is pressed out from the center toward the two open ends of the tool mold.

8. Apparatus (1) for the production of a sheath having a greater length, for foods from a plurality of individual sheath sections composed of casings that contain collagens, comprising a mandrel (2) and at least two sheath sections (3), wherein the sheath sections (3) are pushed on over the mandrel (2) in order to create an overlapping region (4), and disposed overlapping one another, and having a heating element (5) for temporary exchange of heat between heating element (5) and the overlapping region (4), so that the sheath sections are welded to one another, at least in part, in the overlapping region (4), and a controller which is programmed to energize the heating element (5) only after water is pressed out of the overlapping region (4), and having a deformable expansion body (6), wherein this body is configured to surround the mandrel (2) in the manner of a ring, and is disposed within the sheath sections (3), wherein the deformable expansion body (6) is configured to comprise an elastically deformable material, and having a tool mold (7) that encloses the mandrel (2) in certain sections, wherein a heating wire or foil is provided as a heating element (5), wherein the heating element (5) is disposed between the tool mold (7) and the overlapping region (4)

wherein the tool mold (7) is configured to form the sheath sections (3), divided with a gap (29).

9. Apparatus for welding of casings according to claim 8, wherein a welding chamber (20) that encloses the expansion body (6) is formed between expansion body (6) and tool mold (7), an axial expanse of which chamber is configured to correspond at least to the length of the expansion body (6).

10. Apparatus for welding of casings according to claim 8, wherein the heating element (5) is configured to be covered with a parting layer (8) and/or a parting layer (8) is provided between the heating element (5) and the tool mold (7).

11. Apparatus for welding of casings according to claim 10,
wherein the parting layer (8) is configured as a PTFE-coated woven fabric.

12. Apparatus for welding of casings according to claim 8, wherein the heating element is configured with the same shape for different calibers (9), wherein a heating zone is configured with different lengths and adapted to the caliber.

13. Apparatus for welding of casings according to claim 12,
wherein the heating element is a foil heating element.

14. Apparatus for welding of casings according to claim 8, wherein the heating element (5) has oblong holes (12) for fastening the heating element (5) in the tool mold, at its flattened ends (31).

15. Apparatus for welding of casings according to claim 8, wherein a controller is provided, which is configured to use an instantaneous resistance value of the heating element as a temperature signal.

16. Apparatus for welding of casings according to claim 8, wherein the tool mold (7) has a closing device (14).

17. Apparatus for welding of casings according to claim 16,
wherein the closing device (14) is a self-holding closing device (14).

18. Apparatus for welding of casings according to claim 8, wherein a mandrel tip (16), including the expansion body (6), is configured as a module (17).

19. Apparatus for welding of casings according to claim 18,
wherein the module (17) is configured to be rapidly interchangeable as a whole.

20. Apparatus for welding casings according to claim 8, wherein said foods are sausages, and
wherein said casings are natural casings or synthetic casings containing collagens.

* * * * *